INVENTORS
Frank J. Marino
Anthony P. Marino
BY

Philip B. Hilbert
ATTORNEY

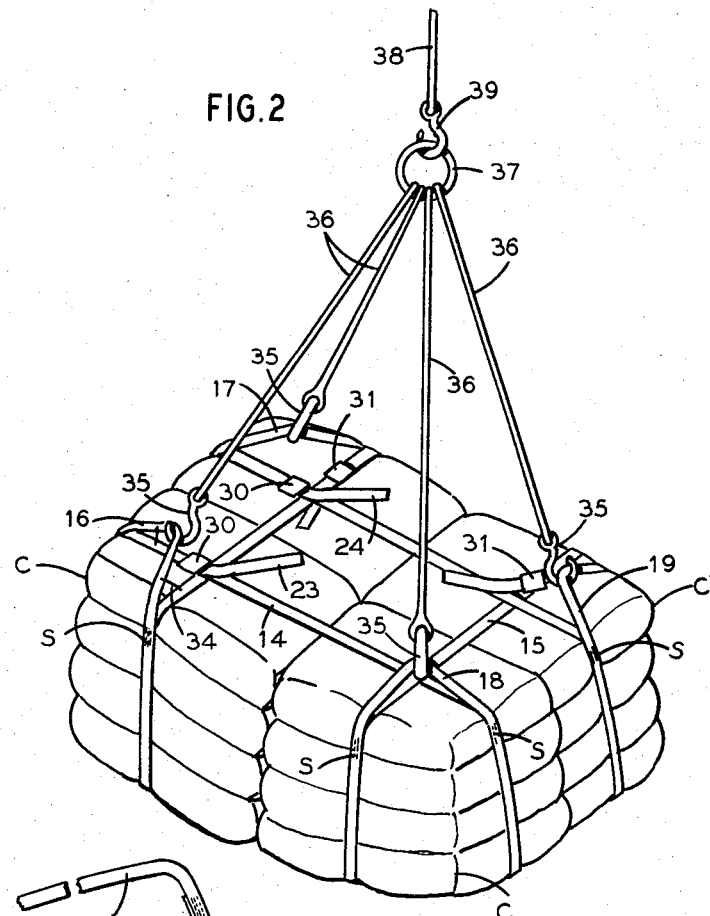
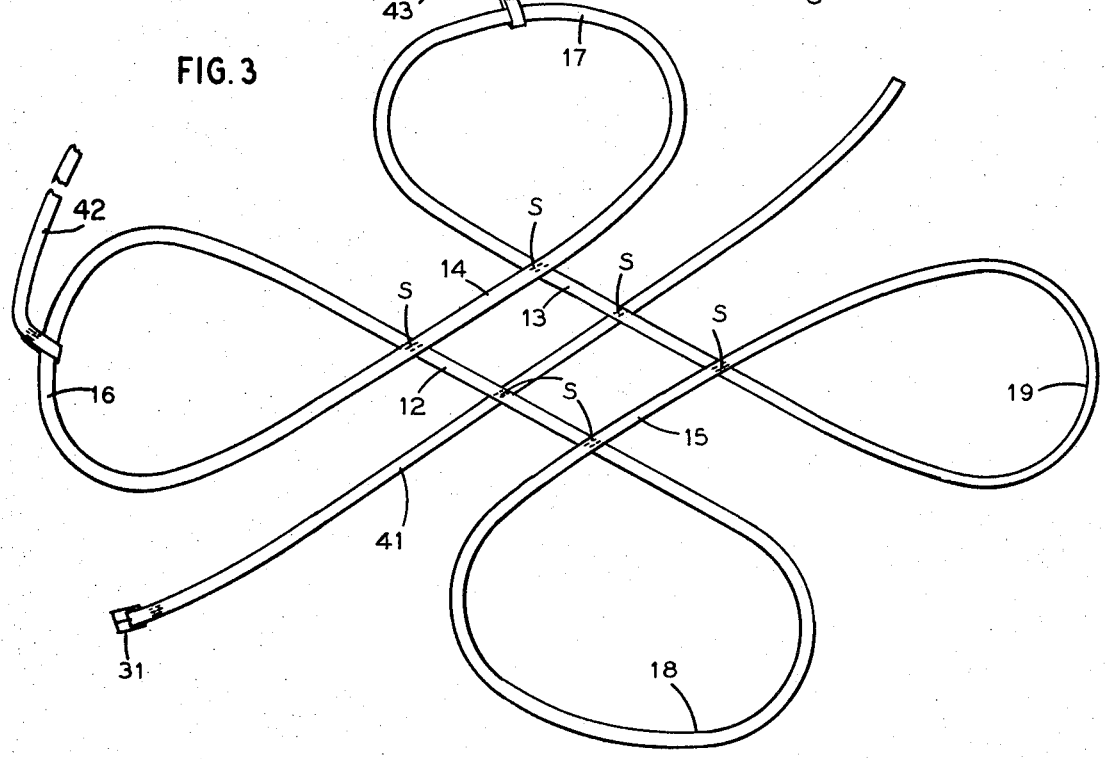

United States Patent Office 3,701,559
Patented Oct. 31, 1972

3,701,559
COMBINATION SLING AND UNITIZING MEANS
Frank J. Marino and Anthony P. Marino, Brooklyn, N.Y.,
assignors to Marino Systems, Inc., Bay Shore, N.Y.
Filed Mar. 25, 1971, Ser. No. 128,352
Int. Cl. B66c 1/18
U.S. Cl. 294—74
4 Claims

ABSTRACT OF THE DISCLOSURE

A cargo sling for unitizing a plurality of cargo units; the sling being adapted to remain with the unitized cargo units to facilitate successive transfer operations as the cargo units are moved between warehouses and various transport means.

BACKGROUND OF THE INVENTION

Conventional cargo slings are adapted for single transfer operations of cargo units loosely disposed within the sling, between two points, as between a ship and a pier; a pier and a ship; different forms of transport means, and the like. Obviously, this entails repeated handling of the cargo units in their successive movements and gives rise to substantial handling costs.

Such repeated handling necessarily tends to increase loss of cargo units, damage to such units, storage problems including estimate of space requirement, and non-uniformity in handling and transfer operations; all of which further increase handling costs.

Accordingly, an object of this invention is to provide improved sling means for transferring cargo; such sling means being of a character to unitize a plurality of cargo units, whereby the sling means may remain with the united cargo units during successive transfer operations between various storage and transport facilities.

Another object of this invention is to provide sling means of the character described, which is of a construction which allows the cargo units to be arranged in a unitized body of uniform so as to facilitate handling and storage operations.

Yet another object of this invention is to provide a sling means of the character described, which is made up of webbing with portions thereof geometrically related so as to minimize the amount of webbing used to make such sling means, yet is adequate to unitize and retain a plurality of cargo units.

Still another object of this invention is to provide an improved sling means which lends itself to easy and rapid manipulation to receive and retain a plurality of cargo units in unitized form.

Yet a further object of this invention is to provide sling means of the character described, wherein the webbing used may be selectively varied to suit specified load and bulk capacities.

Still a further object of this invention is to provide sling means of the character described, wherein the webbing thereof may be arranged in varied geometric patterns to suit the character, weight and bulk of the cargo units to be unitized thereby.

Yet another object of this invention is to provide sling means of the character described, which is of minimum weight and bulk in its collapsed, unused condition, thereby facilitating the transport thereof to desired loading points; and minimizing weight added to the unitized cargo when the same is in its erected unitizing condition.

Other objects of this invention will in part be obvious and in part hereinafter pointed out.

DESCRIPTION OF THE DRAWINGS

FIG. 2 is in a perspective view showing the sling in its operative condition;

FIG. 3 is a plan view of another embodiment of the invention; and

DESCRIPTION OF THE PREFERRED EMBODIMENTS

The device of the instant invention comprises a sling construction made up of webbing arranged in a predetermined geometrical pattern. Such arrangement of webbing permits the disposition of cargo units thereon in a manner whereby the webbing embraces the cargo units and retains the same as a body of predetermined geometrical outline and bulk.

Figure 1:
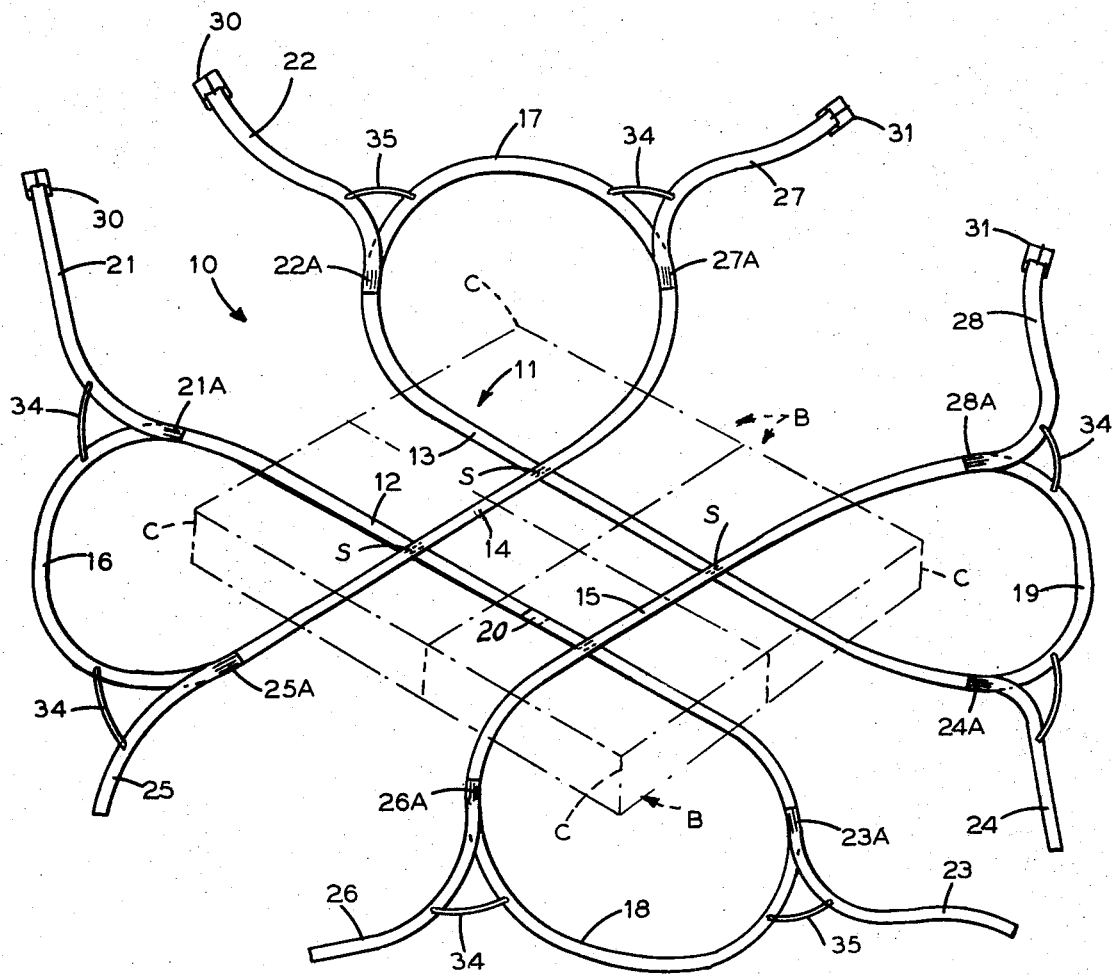
FIG. 1 is a plan view of a combination sling and unitizing means embodying the invention.

Thus, as shown in FIG. 1, 10 designates a sling and unitizing means embodying the invention. The same is constituted of webbing 11 of predetermined gauge and width suited to the nature of the cargo units, the total weight thereof and the configuration of the same. Such webbing may be formed of nylon or other suitable textile materials, as well as strapping or the like.

Webbing 11 may be a single strip which is laid out in a predetermined pattern as indicated in FIG. 1. Thus, strip 11 is convoluted to provide a first pair of parallel portions 12, 13 and a second pair of parallel portions 14, 15 which extend transversely of portions 12, 13.

Further, strip portions 12, 14 are joined in a loop portion 16; portions 13, 14 are joined to form a loop 17; portions 12, 15 are joined to form loop 18 and portions 13, 15 are joined to form loop 19. Thus, the loops 16–19 are in quadrangular relation to each other and provide the four corner portions thereof. The ends of the strip 11 are overlapped and secured together by sewing or the like, as at 20. The intersecting strip portions 12, 14; 13, 14; 12, 15; and 13, 15, are secured together by sewing or the like as at S.

A series of strap elements 21–28, which may also be formed of webbing or the like, are attached to the juncture points of loops 16–19 with strip portions 12–15, as at 21A; 22A; 23A; 24A; 25A; 26A; 27A; and 28A, respectively, by sewing or the like. Buckle means 30, 31 are mounted on the terminal ends of strap elements 21; 22; 27; and 28.

As indicated in FIGS. 1, 2, cargo units to be unitized by device 10, may take various forms, and for the purpose of illustration are shown as bags B such as used to contain coffee beans or the like. Bags B are laid over the intersecting portions of strip portions 12, 13, 14, 15 and locating the corners C of the bags B in loops 16–19 respectively.

When bags B are loaded to a specified level related to the dimensions of loops 16–19; said loop portions are lifted to vertical positions so that the same embrace outer surface portions of cargo units B on either side of corners C thereof. The strap portions 25, 26 are interengaged with strap portions 27, 28 by way of buckles 31; the interengaged strap portions extending over the top surface of bags B. Then strap portions 21, 22 are interengaged with strap portions 23, 24 by way of buckles 30. Thus, the interengaged strap portions 21–28 are now disposed in intersecting relation over the top surface of the topmost layer of bags B, FIG. 2.

The thus unitized cargo units B may be engaged by the usual hooks 35 attached to bridle elements 36; the elements 36 being brought together and secured in a ring 37. The usual lifting cable 38 and its hook 39 engage ring 37 for raising the unitized cargo units B and lowering the same as desired. Upon initially lifting unitized cargo units B, it may be necessary to retighten the strap portions 21–28.

It will be apparent that device 10 is well adapted to stay with the unitized cargo units B to allow for the usual series of transfer operations, as for example, from a warehouse to transport means, such as ship or plane and the like; and thereafter from the transport means to another warehouse, as well as to and from auxiliary transport and storage means. When the unitized cargo unts reach their ultimate destination, the strap portions 21–28 are disengaged to allow for access to the individual bags B. The device 10 in rolled or folded form is ready for immediate use with new cargo units or for compact transportation to another point of usage.

It is understood that bags B or other cargo units are loaded on device 10 to a level such that upon cinching strap portions 21–28, loops 16–19 will have topmost portions free for engagement by hooks 35, FIG. 2. When such loop portions are disengaged, they are freely movable and may fall rearwardly so as to locate the same in inaccessible positions between adjacent stored cargo bodies.

Accordingly, elastic elements 34 are provided which interconnect loop portions 16–19 to strap portions 21–28 at points spaced from the junctions 21A–28A, thereby leaving the engageable portions of the loop portions 16–19 in an accessible position over the top surface of the cargo body.

Figure 4:
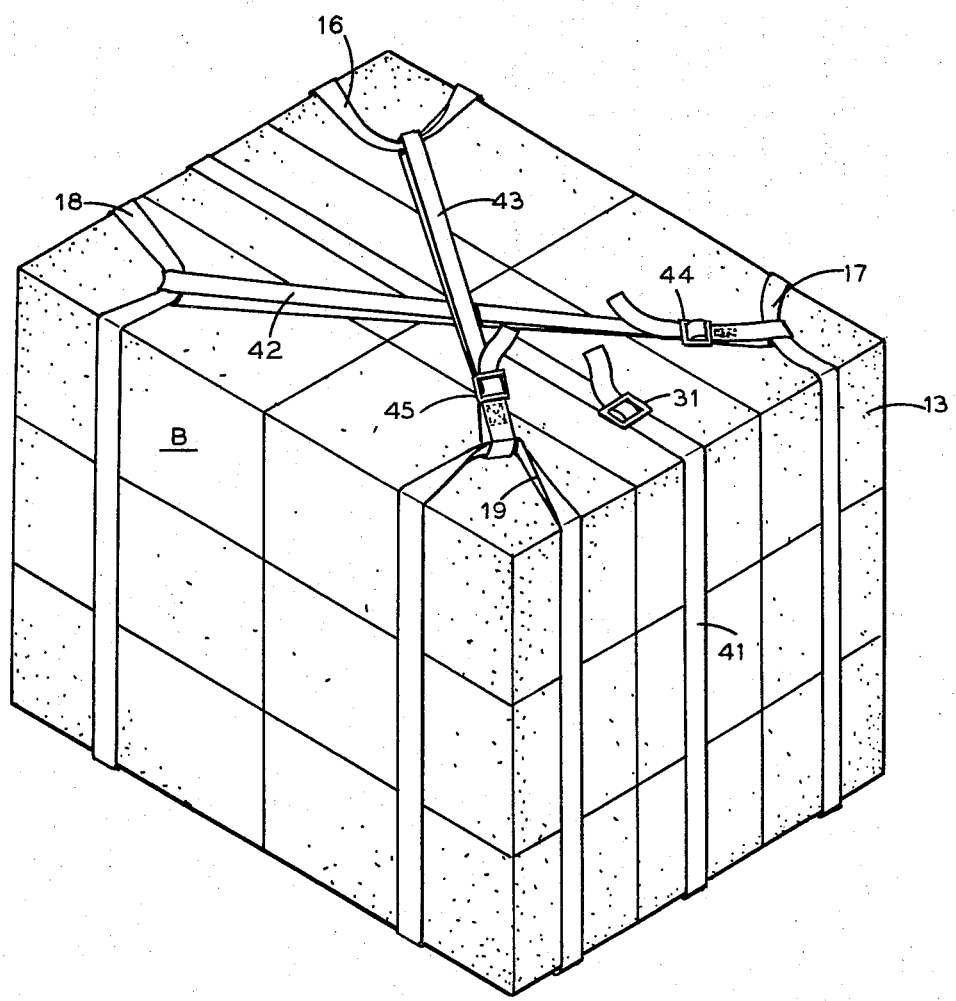
FIG. 4 is a perspective view showing the sling of FIG. 3 in its operative condition.

Another embodiment of the invention is shown in FIGS. 3, 4 wherein sling 40 is similar to sling 10 except that a single long strap 41 is located between strip portions 14, 15 in parallel relation thereto and in transverse relation to strip portions 12, 13. Strap 41 is provided with a buckle 31 at one and thereof. Also, a strap 42 is disposed to interconnect the diagonally related loops 17, 18 and a strap 43 is disposed to interconnect loops 16, 19; said straps 42, 43 then being diagonally related, with buckles 44, 45 respectively mounted on said straps.

Here, the cargo units B are disposed on the intersecting strip portions 12, 13; 14, 15; the loops 16–19 are raised to their vertical positions to receive corner portions C therein. Strap 41 is cinched at its ends by buckle 31, while diagonally related loops 16, 19 and 17, 18 are drawn tightly toward each other over the top surface of the cargo body, by straps 43, 42.

The hooks 35 may be engaged with loops 16–19 by suitable inserting movement of the hook ends with respect to said loops.

The arrangement of loops and strips in relation to the cargo units B is adequate to effect a tight consolidation of said units into a well unitized body which is readily handled, stored and disassembled for access to the individual units B.

We claim:

1. A combination sling and unitizing means for a cargo body, said means comprising a closed loop unitary strip member having first portions thereof disposed in intersecting relation to provide a base for receiving thereon the bottom surface of said cargo body, second portions extending from said first portions for contacting side surface portions of said cargo body, and loop portions extending from said second portions; relatively nonelastic strap means secured at one end thereof to each of the junctures of said second portions and said loop portions, detachable means for tightly interengaging opposed other ends of said strap means to maintain said first and second strip portions in tight contact with the respective surface portions of said cargo body, whereby when said strip member is loaded with cargo and said opposed strap means interengaged, said loop portions remain free from the load to receive a hoisting device, and whereby said sling will remain about said cargo body during shipment and subsequent handling to unitize said cargo.

2. A sling as in claim 1, wherein said strip portions are disposed at right angles to each other, and said loop portions are in quadrangular relation to each other.

3. A sling as in claim 2, wherein said strip portions comprise a first pair of parallel strip elements and a second pair of parallel strip elements transversely disposed with respect to said first pair of strip elements, said loop portions interconnecting terminal portions of said strip elements.

4. A sling as in claim 1, and further including elastic means interconnecting adjacent strap means and loop portions at points spaced from the juncture of said strap means and said loop portions.

References Cited

UNITED STATES PATENTS

| 2,687,321 | 8/1954 | Toffolon | 294—74 |

FOREIGN PATENTS

| 1,551,799 | 12/1968 | France | 206—65 B |
| 188,188 | 3/1964 | Sweden | 294—77 |

EVON C. BLUNK, Primary Examiner

J. D. CHERRY, Assistant Examiner

U.S. Cl. X.R.

206—65 B

UNITED STATES PATENT OFFICE
CERTIFICATE OF CORRECTION

Patent No. 3,701,559　　　　　　　Dated October 31, 1972

Inventor(s) Frank J. Marino

It is certified that error appears in the above-identified patent and that said Letters Patent are hereby corrected as shown below:

On Sheet 1 - 3 of the drawings and in column 1, line 5,

"March 25, 1971" should read -- March 26, 1971 --.

Signed and sealed this 8th day of October 1974.

(SEAL)
Attest:

McCOY M. GIBSON JR.　　　　　　　　C. MARSHALL DANN
Attesting Officer　　　　　　　　Commissioner of Patents